(12) United States Patent  
Egan, III (10) Patent No.: US 7,794,609 B2  
(45) Date of Patent: Sep. 14, 2010

(54) CENTRIFUGAL FLOW DISTRIBUTION CLARIFIER FEEDWELL AND METHOD OF FEEDING INFLUENT TO A CLARIFIER THEREBY

(75) Inventor: John J. Egan, III, Centerville, OH (US)

(73) Assignee: Kadant Black Clawson Inc., Mason, OH (US)

( * ) Notice: Subject to any disclaimer, the term of this patent is extended or adjusted under 35 U.S.C. 154(b) by 60 days.

(21) Appl. No.: 12/085,285

(22) PCT Filed: Nov. 1, 2006

(86) PCT No.: PCT/US2006/042911

§ 371 (c)(1),  
(2), (4) Date: May 20, 2008

(87) PCT Pub. No.: WO2007/061599

PCT Pub. Date: May 31, 2007

(65) Prior Publication Data

US 2009/0173701 A1    Jul. 9, 2009

Related U.S. Application Data

(60) Provisional application No. 60/739,520, filed on Nov. 23, 2005.

(51) Int. Cl.  
*B01D 21/24* (2006.01)

(52) U.S. Cl. .............. 210/801; 210/519; 210/532.1

(58) Field of Classification Search ............... 210/788, 210/800, 801, 512.1, 519, 528, 532.1  
See application file for complete search history.

(56) References Cited

U.S. PATENT DOCUMENTS 1,526,197 A * 2/1925 Ahlqvist .................. 210/801

(Continued)

FOREIGN PATENT DOCUMENTS

DE          3818624       12/1989

(Continued)

*Primary Examiner*—Christopher Upton  
(74) *Attorney, Agent, or Firm*—Wegman, Hessler & Vanderburg (57) ABSTRACT

Apparatus and methods are provided for controlling influent feed to produce a substantially uniform flow to a clarifier tank (2) to thereby enhance the settling efficiency within the clarifier. The apparatus comprises a feedwell (24) having a roof (26) and continuous sidewall (28) that together define a feedwell main body enclosure. Influent is fed via a relatively inboard tangential feed mechanism (108) to the inside of the roof (26) from an entry point proximate the center of the roof (150). Influent energy is properly distributed via the action of centrifugal force to generate a uniform axial flow within the feedwell main body which, in turn, is fed into the clarifier tank. Optional baffle members (152, 158) may be provided in the housing to slow angular momentum of the influent which, due to its original feed location, would necessarily be at a relatively low level.

17 Claims, 7 Drawing Sheets

U.S. PATENT DOCUMENTS

| | | | |
|---|---|---|---|
| 2,127,314 A * | 8/1938 | Spaulding | 210/519 |
| 2,528,094 A | 10/1950 | Walker | |
| 3,486,628 A | 12/1969 | Darby | |
| 4,278,541 A | 7/1981 | Eis et al. | |
| 4,541,850 A * | 9/1985 | Oda et al. | 210/519 |
| 5,147,556 A * | 9/1992 | Taylor | 210/519 |
| 5,769,243 A | 6/1998 | McCarthy | |
| 5,944,995 A | 8/1999 | Sethi et al. | |
| 6,276,537 B1 | 8/2001 | Esler et al. | |
| 6,343,698 B1 | 2/2002 | Than et al. | |
| 6,607,671 B2 * | 8/2003 | Vuong | 210/519 |
| 6,966,985 B2 * | 11/2005 | Schoenbrunn et al. | 210/519 |
| 2004/0226880 A1 | 11/2004 | Brown et al. | |

FOREIGN PATENT DOCUMENTS

| | | |
|---|---|---|
| SU | 1180042 | 9/1985 |
| WO | WO9937378 | 7/1999 |
| WO | WO03000379 | 1/2003 |

* cited by examiner

CENTRIFUGAL FLOW DISTRIBUTION CLARIFIER FEEDWELL AND METHOD OF FEEDING INFLUENT TO A CLARIFIER THEREBY

CROSS REFERENCE TO RELATED APPLICATION

The present application claims priority under 35 U.S.C. §119(e) to U.S. Provisional Patent Application No. 60/739,520, filed Nov. 23, 2005.

FIELD OF INVENTION

The present invention relates to a feedwell apparatus for feeding fluid to a clarifier in a manner such that the clarifier performance will be improved via minimization of average fluid velocity, fluid velocity variation, and vorticity (localized rotation of fluid) of influent in the clarifier and to methods for feeding a clarifier in this manner.

BACKGROUND OF THE INVENTION

Clarifiers are commonly used in many industries to separate an influent flow containing solids materials into an underflow sludge or solids component and a clarified liquid phase. Clarifier tanks conventionally comprise a tank bounded by a concave cross-sectioned floor and upstanding wall member which together form an enclosure within which the clarification occurs via sedimentation principles. Rotatable rake members or the like rotate to scrape underflow, thickened sludge from the floor to an underflow drain or discharge line while clarified liquid at the top of the clarifier tank flows over a weir or the like for collection.

In conventional clarifier tanks as described, an influent stream is introduced into the tank from a feedwell that is usually located in a central, upper portion of the tank. Introduction into the clarifier of an influent stream under conditions of high velocity variation and therefore higher peak flow velocities than desired tends to disturb or impede efficient settling of the liquor in the tank due to the turbulent action of the higher flow velocities on the settling solids particles.

Many of the existing clarifier feedwell designs include a number of features (separately or in combination) that contribute to uneven flow of the influent into the clarifier and therefore degrade clarifier performance. These features include:

1. Tangential feed flow to the feedwell (at the feedwell OD) with no provision to evenly distribute the flow either radially or circumferentially. This, in turn, leads to uneven flow into the clarifier. The tangential feed also adds relatively high levels of angular momentum to the clarifier which disrupts overall clarifier flow by "short-circuiting" the overall clarifier flow field with centrifugally driven radial (verses the desired axial—at this location of the clarifier) flow velocities.
2. Dual counter acting identical tangential feed streams which collide with one another within the feedwell. This "ideally" cancels angular momentum, but at the same time, exacerbates flow bias within the unit, so that overall flow improvement, in the clarifier ends up being minimal.
3. Relatively tall feedwell (and therefore feedwell feed) height for flow settling purposes in an attempt to compensate for 1 and 2 above. Consequently, when the clarifier is operated so that the liquor fluid surface is below this higher feed height, a "waterfall" is created from the feed level to the fluid surface level. This adds unwanted turbulence to the fluid which works against the quiescence in the flow required in the clarifier, and, at the same time, entrains air into the fluid (thus imparting additional upward flow to the fluid via the addition of more air bubbles) which, in turn, inhibits the downward movement of the solids to be settled.

SUMMARY OF THE INVENTION

In accordance with the invention, centrifugal force of a spinning fluid is used to spread the influent feed into one having a more uniform flow distribution. In one aspect of the invention, this spin is added to the influent via a tangential feed proximate the center of the feedwell roof.

For solids settling to take place efficiently within a clarifier, the fluid flow of the influent should be not only slow, but also such that flow disturbances (which contribute to unwanted fluid/solid mixing) are controlled to remain at a minimum. This means that three conditions should preferably exist within the clarifier system: (1) the average fluid speed should be as low as possible (for a given process through flow); (2) variation of the speed from average values should be small to minimize fluid shear; and (3) local rotation of the flow or vorticity should be limited in order to control unwanted fluid mixing.

Accordingly, the three parameters below associated with the fluid flow in the clarifier can be monitored in each of three fluid volumes (which make up the total fluid volume of the clarifier) to determine clarifier performance. The parameters are:

1. Average Speed=$\overline{m}(S)$
2. Standard Deviation of Speed=$\sigma(S)$
3. Sum of (Vorticity Magnitude)$^2$=$\Sigma|\xi|^2$ where $$\xi = \text{Vorticity} = \nabla \times \overline{V}$$
$$\overline{V} = \text{Velocity Vector} = u\,\overline{i} + v\,\overline{j} = w\,\overline{k}$$
$$\nabla = \text{Del Operator} = \frac{d}{dx}\overline{i} + \frac{d}{dy}\overline{j} + \frac{d}{dz}\overline{k}$$
$$S = \text{Speed} = \sqrt{u^2 + v^2 + w^2}$$

Clearly, consistent with the discussion above, each of the three parameters above should be as low as possible. This will result in desired fluid speed, while, at the same time, minimizing deleterious re-mixing of the settling solids due to the maintenance of low levels of fluid shear and rotation in the clarifier liquor flow.

Note that the third of the above performance parameters is calculated by summing the square of the magnitude of vorticity. It is known that vorticity has both positive and negative values (denoting fluid spin direction) either of which will disrupt the ideally smooth flow of the clarifier liquor. A situation in which the sum of the vorticity magnitudes could be "zero" can be envisioned indicating good clarification efficiency, while in reality high ± values of the vorticity magnitude would exist in the flow that were actually causing bad clarification efficiency. This possibility is eliminated by summing the square of the vorticity magnitudes.

In one exemplary embodiment of the invention a feedwell is provided that effectively controls the influent flow to a clarifier tank. The feedwell comprises a wall member having an upper perimeter edge and a lower perimeter edge. The wall member presents a substantially continuous surface extending from the upper perimeter edge to the lower perimeter edge and, in cross-section viewed from the top or bottom of the wall, presents a substantially circular cross-sectional area. A roof member is provided that spans the upper perimeter edge of the wall member and includes an underside surface that, together with the wall member, defines a boundary to form an enclosure. The roof further comprises a centrally disposed opening therein and a feed member adjacent to the opening is adapted to provide influent fluid flow into the feedwell from above the roof.

In another exemplary embodiment, the continuous wall circumscribes the enclosure and the enclosure includes a central axis extending through the feedwell opening in the roof. The feed member comprises a feed member housing superposed over the opening and a tangential inlet communicates with the feed member housing for imparting an influent flow substantially uniformly radially along the underside of the roof from the central axis toward the continuous sidewall member. The roof presents a downwardly and angularly outwardly disposed surface proceeding from the feed member housing to the upper perimeter edge of the sidewall.

In another exemplary embodiment, the tangential inlet module may comprise an upstanding baffle member therein, and the feedwell main body enclosure itself may comprise a plurality of vertically extending baffles extending radially inwardly from the inside wall of the continuous sidewall member toward the central axis. Additionally, the continuous sidewall may be provided with a larger cross-sectional area in the region of the upper perimeter edge than in the lower perimeter edge portion. Accordingly, the inside surface of the sidewall slopes downwardly and radially inwardly relative to the central axis proceeding from the roof toward the clarifier tank.

A flow settling rim member can be attached to the sidewall to provide another contact surface to dissipate the energy of the influent feed into the clarifier.

The invention also pertains to methods for providing influent feed from a feedwell to an underlying clarifier tank comprising providing a feedwell formed from a roof with an underside surface provided on the roof. Also, a continuous sidewall member is provided that has an inside surface wherein the continuous sidewall member is disposed below the roof. Together, the underside surface of the roof and the inside surface of the continuous sidewall member define a substantially circularly cross-sectioned housing with a centrally disposed axis extending therethrough.

Influent is fed along the underside of the roof from an inlet that is located proximate the central axis to form a fluid flow that is substantially uniformly disposed around the central axis and flows substantially radially outward from the central axis along and below the underside of the roof toward and substantially parallel to the inside portion of the wall member. At least a portion of the influent flow stream flowing along the underside of the roof contacts the inwardly sloping inside surface of the sidewall member to further dissipate the fluid tangential rotation, thus flowing influent feed is permitted to descend into the clarifier tank in a reduced energy state so as to enhance clarifier performance.

The angular momentum of the influent feed may also be retarded by the action of upstanding baffle members that are provided in the enclosure.

In another exemplary embodiment, the influent is fed from above the housing through a tangential feed mechanism in communication with the housing proximate the central axis. The roof member extends downwardly and outwardly from the feed mechanism to the continuous sidewall member and presents a sloping surface for contact with the influent feed. Further, the inside portion of the continuous sidewall member comprises an inwardly and downwardly sloping surface relative to the central axis as one proceeds from the roof toward the clarifier tank.

BRIEF DESCRIPTION OF THE DRAWINGS

The invention will be further described in connection with various exemplary embodiments that are illustrated in the appended drawings.

DETAILED DESCRIPTION OF EXEMPLARY EMBODIMENTS

Figure 1:
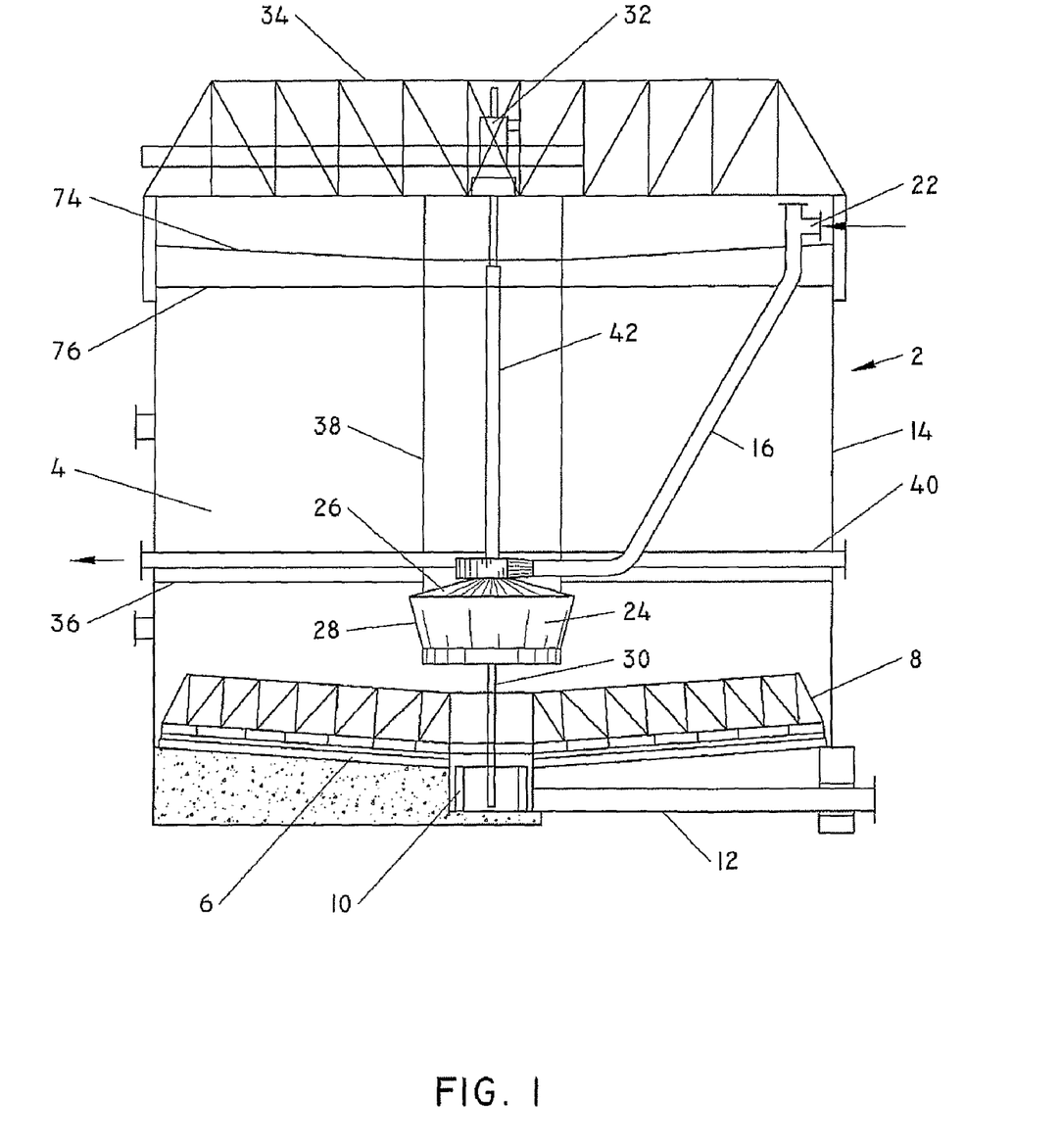
FIG. 1 is a schematic cross-sectional view of a unit storage clarifier tank in accordance with the invention.

Turning first to FIG. 1 of the application, there is shown a clarifier unit 2 of the type commonly used in the clarification of green liquor in a recausticizing process. It is noted that this unit's storage type clarifier tank differs from a standard clarifier tank by having storage capacity for clarified liquid. The unit storage clarifier unit 2 includes a tank 4 having a continuous wall member 14 and a bottom 6. The wall and bottom define a volume enclosure within which a liquid containing solids particulate matter is separated into clarified liquid and liquid/solid phases.

As shown, the bottom 6 is concave in cross-section with the nadir of the bottom terminating in a drain 10 and associated drain line 12 through which solids, underflow material will be removed. Rakes 8, or the like, are driven via shaft 30 so as to rotatably scrape the underflow sludge from the bottom of the tank.

An influent pipe 16 is provided in communication with inlet 22 to provide influent feed to feedwell 24. As shown, the feedwell is of the type having a roof 26 and continuous wall 28 depending therefrom to form a feedwell enclosure.

Driveshaft 30 for the rake is driven via motor 32 that may be, as shown, supported by bridge member 34. Stabilizer cables 36 and 38 suspend the feedwell from the tank and the bridge member respectively. A weir 40 is provided to collect clarified liquor. Further, the clarifier unit may be provided with a vent line 42, coaxially disposed about the shaft 30. A roof 74 is provided over the tank and, as shown, the liquor level in the tank is shown at 76.

It is noted that the feedwells used in unit storage clarifier tanks are normally submerged below the fluid line of the tank and have a substantially enclosed top which prevents influent feed from mixing with the clarified liquid formed in the tank.

Figure 2:
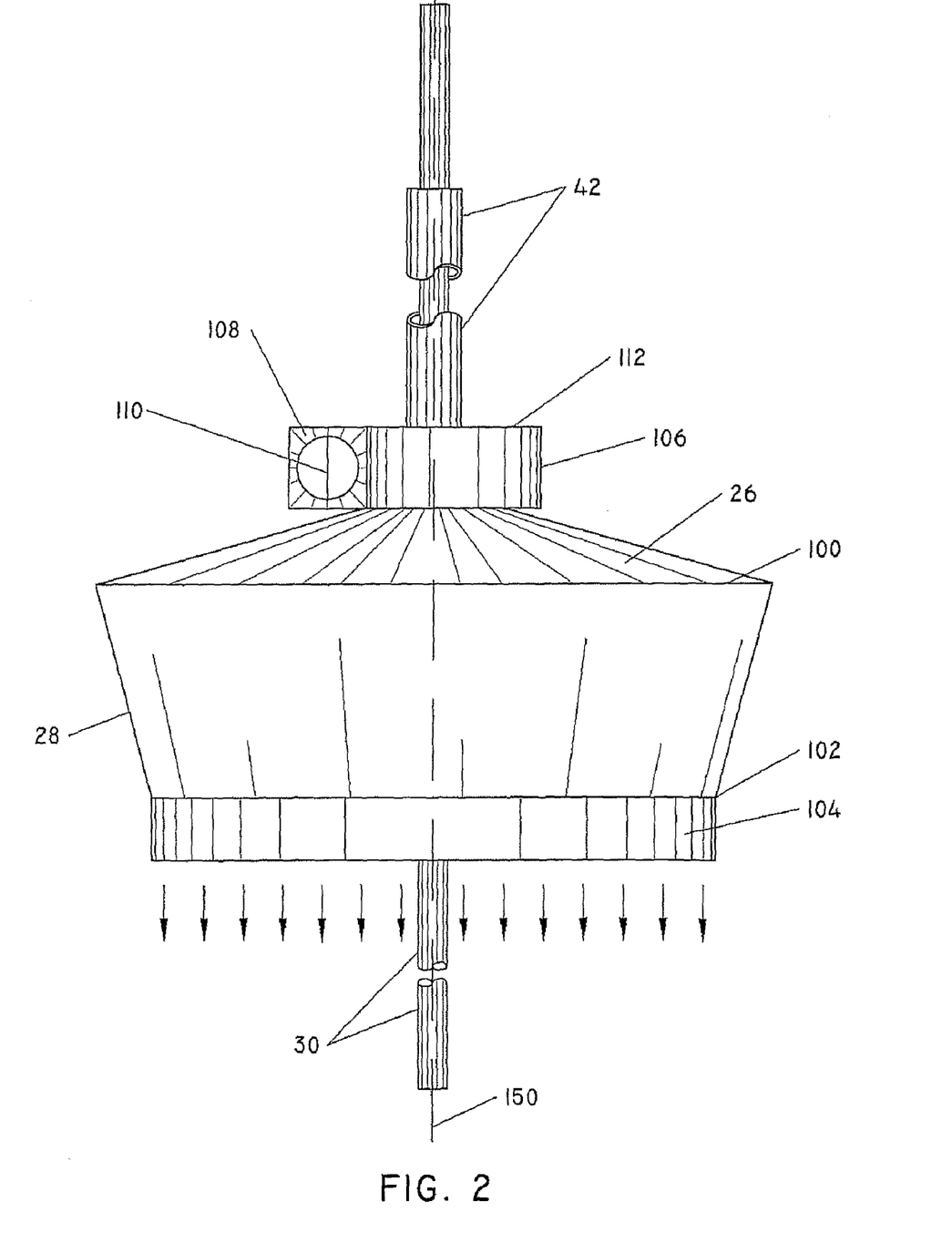
FIG. 2 is a side elevational view of a feedwell in accordance with the invention.
Figure 3:
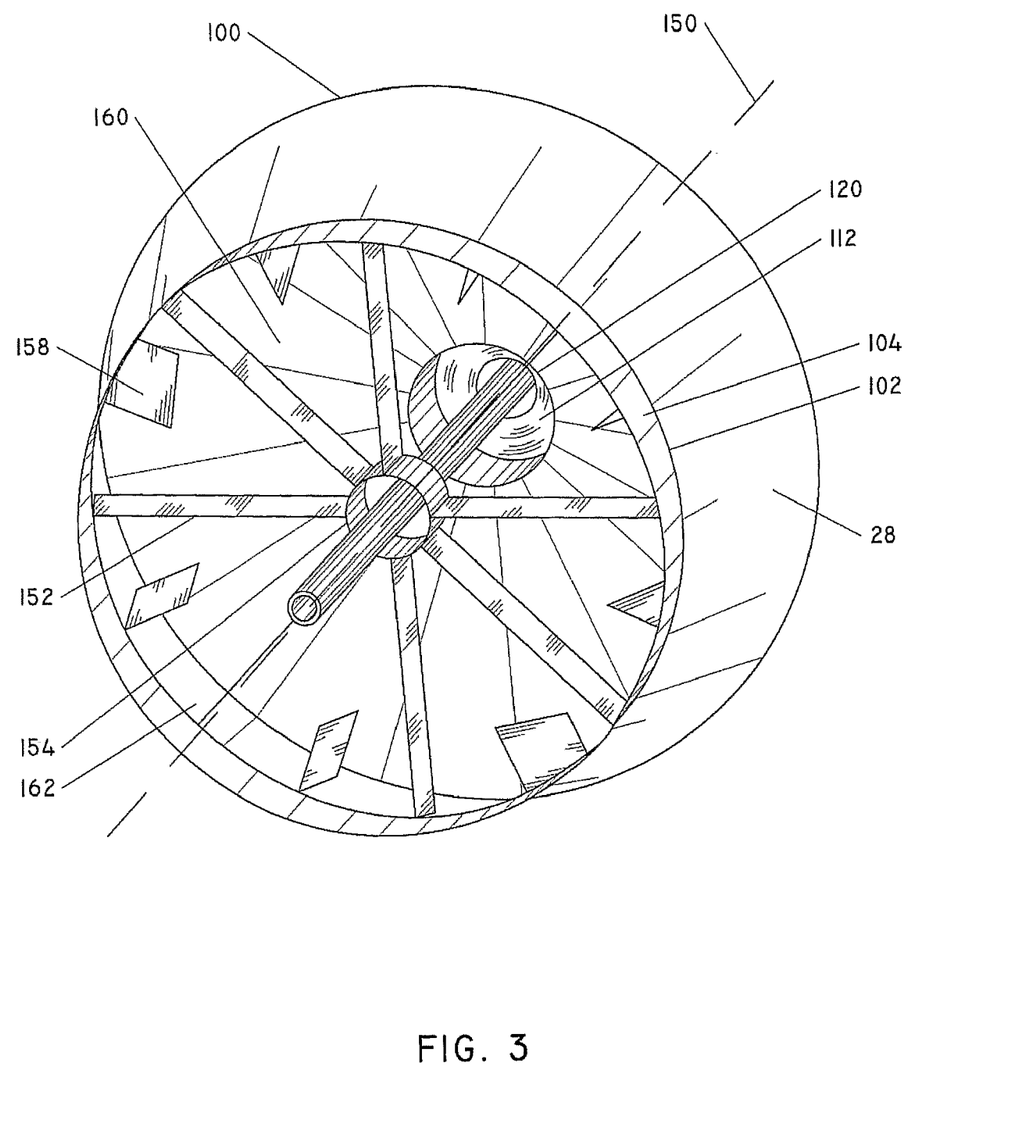
FIG. 3 is a perspective view of the bottom of the feedwell shown in FIG. 2.
Figure 4:
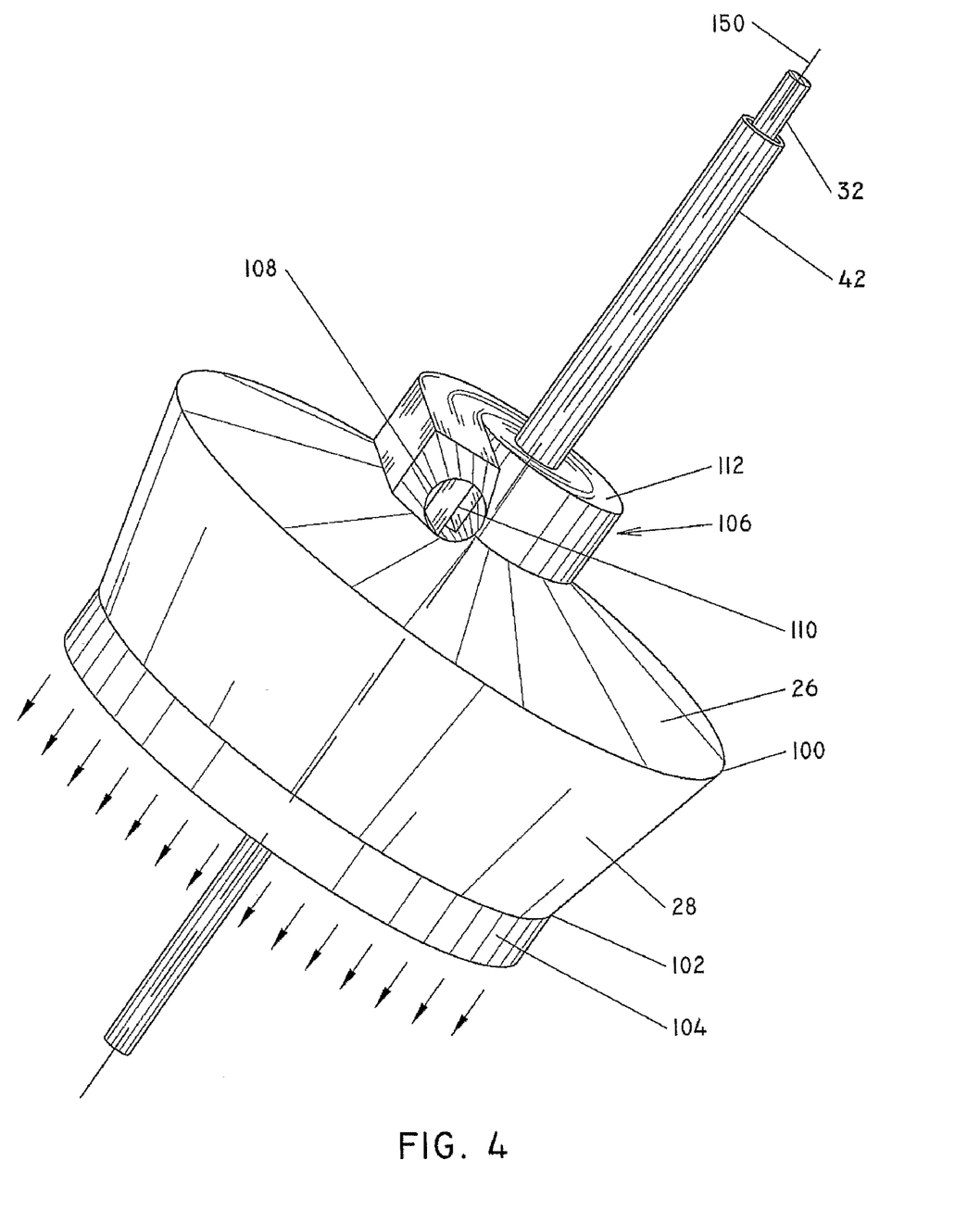
FIG. 4 is a perspective view of the feedwell shown in FIG. 2.
Figure 5:
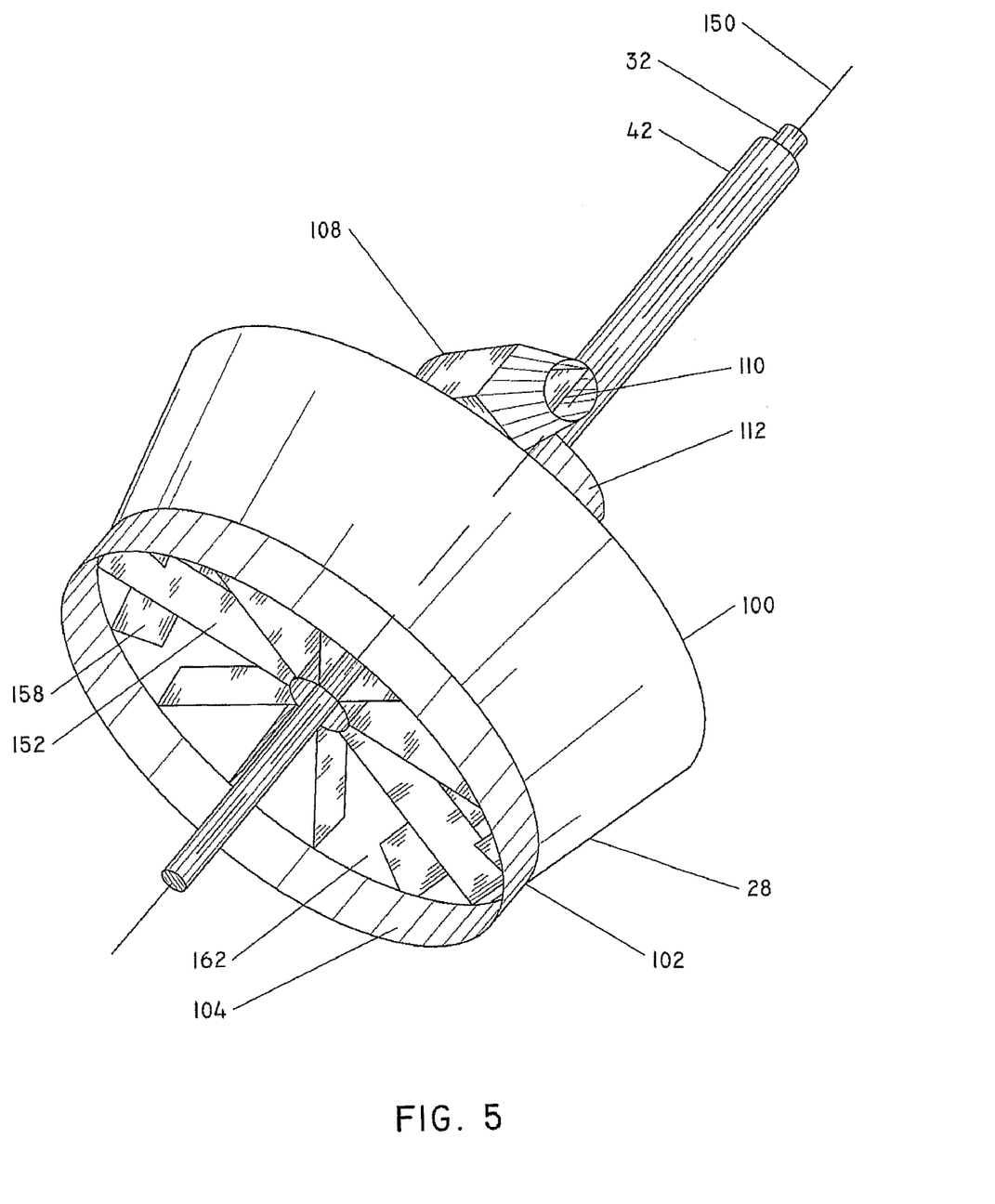
FIG. 5 is another perspective view of the feedwell shown in FIG. 2 illustrating portions of the bottom and side of the feedwell.
Figure 6:
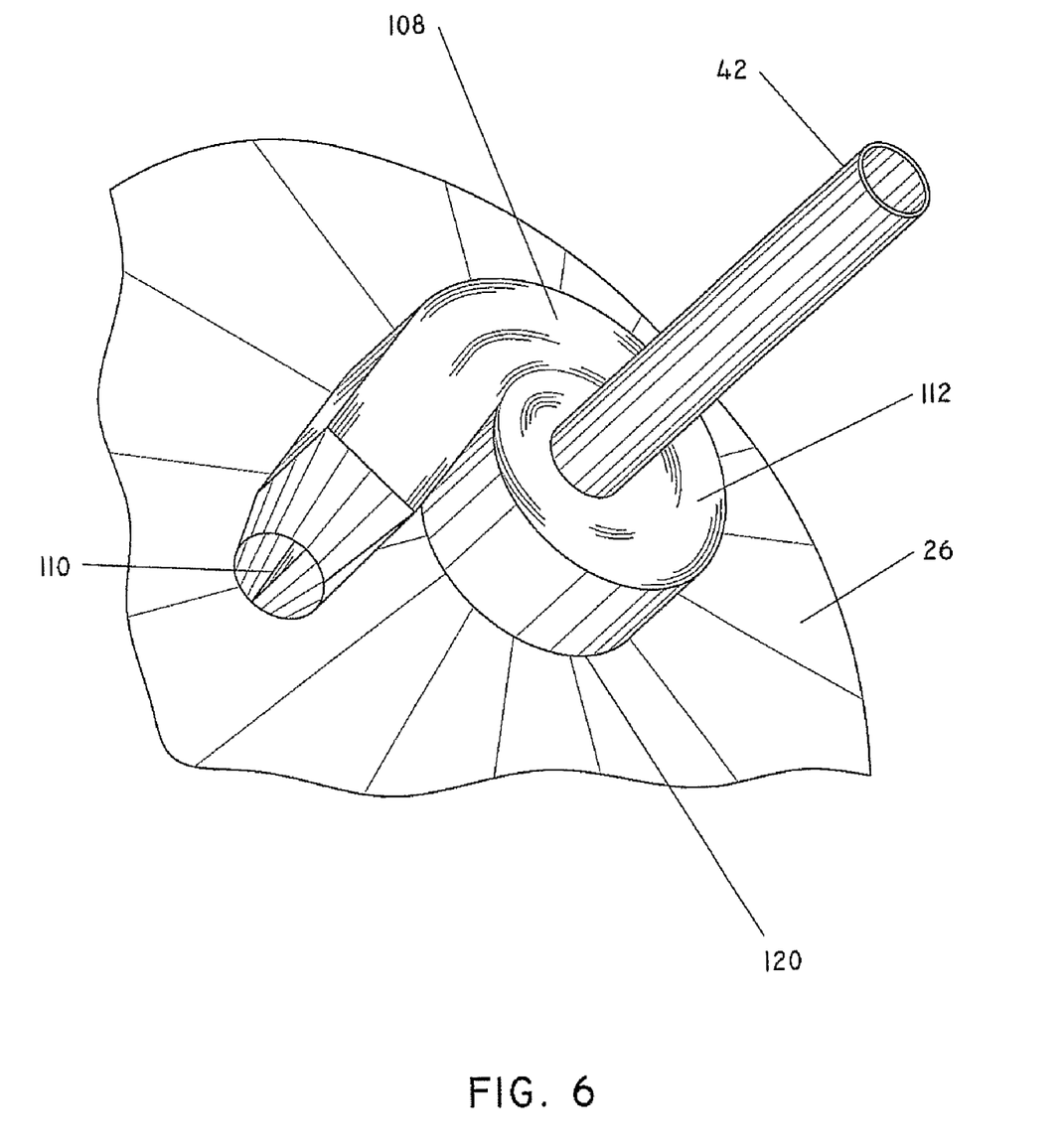
FIG. 6 is a partially cutaway perspective view of the top portion of the feedwell shown in FIG. 2.

Turning to FIGS. 2 and 3, there is shown a feedwell assembly in accordance with one exemplary embodiment of the invention. Here, the feedwell 24 comprises a roof member 26 and continuous sidewall 28 depending downwardly from the roof. The continuous sidewall is bounded by upper perimeter 100 and lower perimeter 102. A flow settling rim 104 may be provided below the lower perimeter 102. A centrally disposed axis 150 extends through the feedwell and, as shown, is concentric with the shaft 30 that is used to provide drive for the rake member.

As best shown in FIGS. 4-7, the feedwell enclosure is basically of circular configuration when viewed in cross-section from a plane above the enclosure. The influent feed housing 106 is provided atop the roof in substantial coaxial alignment with the central axis 150 and central opening 120 provided in the roof. The influent feed housing comprises a substantially circular/spiral like cross-sectioned volute section 112 and communicating tangential inlet member 108 which is provided with an upstanding baffle member 110. The feed housing is placed over the central opening.

Figure 7:
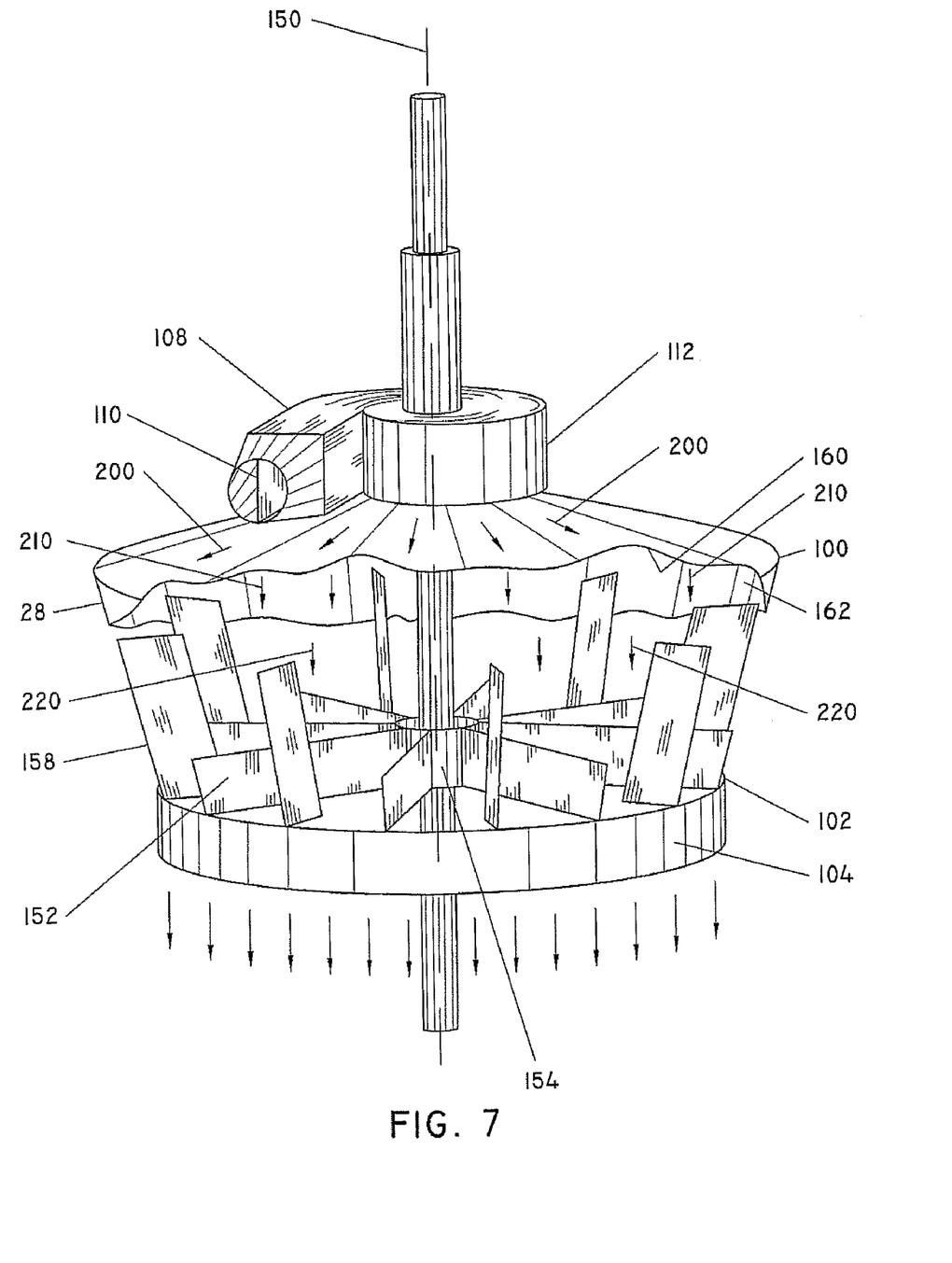
FIG. 7 is a side view of the feedwell with certain parts of the feedwell cut away to highlight the fluid flow direction.

As can be best seen is FIGS. 3 and 7, the roof is provided with an underside member 160 that along with the underside 162 of the continuous sidewall forms a feedwell housing or enclosure. As shown, horizontal baffles 152 are provided that are attached to the inside 162 of the continuous sidewall of the feedwell. These baffles are supported by a boss 154 that may be fixedly secured to the baffles via welding or similar means. As shown, a plurality of vertical baffles 158 are provided and are attached to the inside 162 of the continuous sidewall and extend radially inwardly toward the central axis 150 which extends through the feedwell. These baffles, together, help to dissipate the relatively small level of angular momentum of influent feed that emanates from the underside 160 of the roof or which flows along and inboard from the inside 162 of the continuous sidewall member of the feedwell.

As can be best seen in FIGS. 2 and 7, the roof slants radially outwardly from the volute section 112 of the feed housing toward the upper perimeter 100 of the continuous sidewall 28. Accordingly, on the underside surface of the roof, a downwardly, angularly sloping surface is provided for impingement of the influent feed thereon. Also, as can be seen in FIGS. 2 and 7, the cross-sectional area of the upper perimeter 100 of the continuous sidewall is greater than the lower perimeter 102. This helps to ensure that influent stream from the roof contacts or impinges upon the inwardly sloping inside surface 162 of the sidewall 28 to impart an inward component to the flow vector into the clarifier unit. Further, the flow settling rim 104 may be provided to provide another fluid volume in which any residual turbulent energy of the influent can be further dissipated.

In operation, and as best seen in conjunction with FIG. 7, the influent liquid is directed into the tangential inlet 108 and is separated via baffle 110 as it enters into the volute section 112 of the feedwell housing. This tangential inlet provides circumferential flow direction vectors to the influent fluid, and due to its relative inboard location, helps to decrease the angular momentum of the fluid stream. The circumferential flow spins the fluid passing through the opening 120 so that the resulting centrifugal forces in the flow spread the fluid radially in a relatively uniform manner over the inside of and below the roof so that the fluid flows radially outwardly toward the upper perimeter 100 of the sidewall as shown by vector arrows 200. This process creates an axial flow pattern within the feedwell which is substantially uniform along a radial path from the axis 150 to the perimeter 102 of the clarifier. Any circumferential components of the flow may impinge upon the baffles 152, 158, to thereby retard the angular momentum of same. The fluid from the inside of the sidewall and that dropping directly from the roof 220, then descends into the tank, in a well ordered state and, accordingly, do not adversely affect the settling rate and action of the solid particles within the clarifier unit.

Accordingly, the present invention provides significant advantages. For example, a more even, uniform liquor distribution is provided due to the centrifugal force effects of the influent as it exits the clarifier feedwell into the clarifier tank. Additionally, the angular momentum of the influent is minimized by the small centrally located inlet feed and is dissipated due to the contact of the influent feed with the underside portion of the sloping roof and sloping sidewall member in combination with the baffles. A uniform influent feed is provided both radially and circumferentially into the feed module which is an important first step in creating the uniform flow in the feedwell as a whole.

It is noted that in one exemplary embodiment, the influent fed to the feedwell is distributed via centrifugal force to a small radius section of the feedwell roof, inboard of the perimeter 102. This provides outboard volume within the feedwell main body into which the fluid can be so distributed via the action of the centrifugal force. This also significantly reduces the fluid angular momentum imparted to the feedwell system. In the most preferred aspect of the invention, the influent feed is made at the smalled possible diameter/radius section of the roof, inboard of the perimeter. The influent is spun to create the desired centrifugal force. As shown and described herein, this spinning is accomplished in preferred aspects of the invention by the influent feed housing 106 and associated tangential inlet 108. However, the artisan will appreciate that the desired spinning of the influent needed to impart centrifugal force thereto could be provided by other means such as, for example, the provision of a feed inlet in the feedwell coupled with a fan or the like to act upon the feed and impart the spinning thereto.

In the most preferred aspects of the invention, the fluid is fed tangentially from a small radius section of the housing, preferably the roof, so that it can distribute itself radially outwardly in the main body of the feedwell.

While certain embodiments of the invention have been shown and described herein, it is intended that there be covered as well any change or modification therein which may be made without departing from the spirit and scope of the invention as defined in the appended claims.

What is claimed is:

1. Feedwell for controlling energy of influent flow to a clarifier tank comprising: (a) a wall member having an upper perimeter edge, a lower perimeter edge and a substantially continuous wall extending from said upper perimeter edge to said lower perimeter edge; (b) a roof member spanning said upper perimeter edge of said wall member and including an underside surface defining a boundary with said wall member to form an enclosure, said roof comprising an opening therein; (c) a feed member adjacent said opening and arranged to provide influent fluid flow into said feedwell from above said roof and radially outwardly along and below said underside.

2. Feedwell as recited in claim 1, wherein said continuous wall circumscribes said enclosure in a substantially circular cross-section, said feedwell comprising a central axis extending through said opening.

3. Feedwell as recited in claim 2, wherein said feed member comprises a feed member housing adjacent said opening and a tangential feed inlet communicating with said feed member housing for imparting influent flow substantially uniformly and radially along and below said underside of said roof relative to said axis.

4. Feedwell as recited in claim 3, wherein said tangential feed inlet is positioned proximate said axis.

5. Feedwell for controlling energy of influent flow to a clarifier tank comprising: (a) a wall member having an upper perimeter edge, a lower perimeter edge and a substantially continuous wall extending from said upper perimeter edge to said lower perimeter edge; (b) a roof member spanning said upper perimeter edge of said wall member and including an underside surface defining a boundary with said wall member to form an enclosure, said roof comprising an opening therein; (c) a feed member adjacent said opening and adapted to provide influent fluid flow into said feedwell from above said roof and along and below said underside;

said continuous wall circumscribing said enclosure in a substantially circular cross-section, said feedwell comprising a central axis extending through said opening;

said feed member comprising a feed member housing adjacent said opening and a tangential feed inlet communicating with said feed member housing for imparting influent flow substantially uniformly and radially along and below said underside of said roof relative to said axis;

wherein said roof extends downwardly and angularly outwardly proceeding from said feed member housing to said upper perimeter edge.

6. Feedwell as recited in claim 5, wherein said tangential feed inlet comprises an upstanding baffle member therein.

7. Feedwell as recited in claim 5, wherein said enclosure comprises a plurality of vertically extending baffles therein.

8. Feedwell as recited in claim 5, wherein said upper perimeter edge defines a larger cross-sectional area than said lower perimeter edge.

9. Feedwell as recited in claim 8, wherein said continuous surface defined by said wall member slopes downwardly and inwardly relative to said central axis proceeding from said upper perimeter edge to said lower perimeter edge.

10. Feedwell as recited in claim 5 further comprising a flow settling rim member attached to said lower perimeter edge and defining a second continuous surface surrounding said central axis.

11. Method for providing influent feed from a feedwell to an underlying clarifier tank comprising:
(a) providing a feedwell formed from a roof having an underside surface;
(b) providing a continuous sidewall member having an inside surface wherein said continuous sidewall member is disposed below said roof whereby said underside of said roof and said inside portion of said continuous sidewall member define a substantially circularly cross-sectioned housing with a centrally disposed axis extending therethrough;
(c) feeding said influent along and below said underside of said roof from an inlet proximate said central axis to form a fluid flow substantially uniformly disposed around said central axis and flowing substantially radially outwardly along said underside toward said inside portion of said wall member;
(d) contacting at least a portion of said fluid flow resulting from said step (c) with said inside portion of said continuous sidewall; and
(e) permitting fluid flow from said step (d) to descend into said clarifier tank.

12. Method as recited in claim 11 further comprising retarding angular momentum of said influent fluid by contacting it with upstanding baffle members disposed in said housing.

13. Method as recited in claim 11 wherein said step (c) comprises feeding said influent from above said housing through a tangential feed mechanism in communication with said housing proximate said central axis.

14. Method for providing influent feed from a feedwell to an underlying clarifier tank comprising:
(a) providing a feedwell formed from a roof having an underside surface;
(b) providing a continuous sidewall member having an inside surface wherein said continuous sidewall member is disposed below said roof whereby said underside of said roof and said inside portion of said continuous sidewall member define a substantially circularly cross-sectioned housing with a centrally disposed axis extending therethrough;
(c) feeding said influent along and below said underside of said roof from an inlet proximate said central axis to form a fluid flow substantially uniformly disposed around said central axis and flowing substantially radially outwardly along said underside toward said inside portion of said wall member;
(d) contacting at least a portion of said fluid flow resulting from said step (c) with said inside portion of said continuous sidewall;
(e) permitting fluid flow from said step (d) to descend into said clarifier tank;
wherein said step (c) comprises feeding said influent from above said housing through a tangential feed mechanism in communication with said housing proximate said central axis; and
wherein said roof extends downwardly and outwardly from said feed mechanism to said continuous sidewall member and presents a sloping surface for contact with said influent feed.

15. Method as recited in claim 14, wherein said inside portion of said continuous sidewall member comprises an inwardly sloping surface relative to said central axis proceeding from said roof toward said clarifier tank.

16. Method for improving the distribution of influent feed from a feedwell to an underlying clarifier tank comprising:
(a) providing a feedwell formed from a roof having an underside surface;
(b) providing a continuous sidewall member having an inside surface wherein said continuous sidewall is disposed below said roof whereby said underside of said roof and said inside portion of said continuous sidewall member define a housing with a centrally disposed axis extending therethrough;
(c) feeding said influent into said housing;
(d) imparting a spinning force to said influent to form a fluid flow substantially uniformly disposed around said axis and flowing substantially radially outwardly along and below said underside toward said inside portion of said wall member;
(e) contacting at least a portion of said fluid flow resulting from said step (d) with said inside portion of said continuous sidewall; and
(f) permitting fluid flow from said step (e) to descend into said clarifier tank.

17. Method as recited in claim 16 wherein said step (d) comprises directing said influent through a spin imparting inlet of a feed housing located proximate said central axis.

* * * * *